*Gorham & Williams,*

*Churn Dasher.*

No. 106,575. Patented Aug. 23. 1870.

Inventors.
Gorham & Williams
Per Burridge & Co
Attorneys

Witnesses.
D. L. Humphrey,
Frank Alden

United States Patent Office.

WILLIAM H. H. GORHAM AND BURETT H. WILLIAMS, OF GREENWICH, OHIO.

Letters Patent No. 106,575, dated August 23, 1870.

IMPROVEMENT IN CHURN-DASHERS.

The Schedule referred to in these Letters Patent and making part of the same.

Be it known that we, WILLIAM H. H. GORHAM and BURETT H. WILLIAMS, of Greenwich, in the county of Huron and State of Ohio, have invented certain new and useful Improvements in Churn-Dashers, of which the following is a specification.

Nature and Object of the Invention.

This invention relates to a churn-dasher, consisting of a concavo-convex disk, perforated with holes, and provided with gathering wings, as hereinafter more fully described.

General Description.

Figure 1:
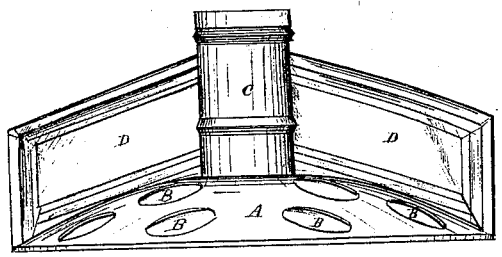
Figure 1 is a side view of the dasher.
Figure 2:
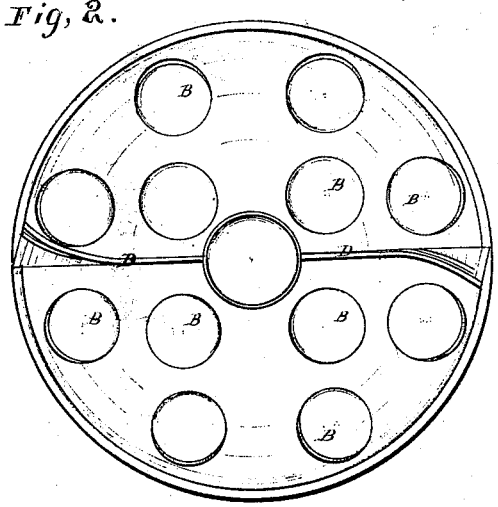
Figure 2, a view of the top.
Like letters of reference refer to like parts in the different views.

In fig. 1—
A represents a metallic disk, the upper side of which is convex, whereas the under side is concave.
Said disk is perforated with a series of holes, B, which may be of any number and size.
C is a socket, in which is secured the handle for working the dasher.
Proceeding from two opposite sides of the socket are wings. Said wings serve as braces to support the socket in its attachment to the disk, and also to strengthen the disk and keep it in shape.

Operation.

The perforated disk agitates the cream in a most thorough manner, breaking it up by forcing it through the holes, so that the work of churning is soon done.
By means of the wings the fragments of butter, while in the milk, are gathered into a single mass by causing the dasher to revolve, thereby bringing the wings to act upon it in the manner of paddles, so that the hands are not required to be in the milk for taking up the floating fragments.
By making the disk concavo-convex, it is thereby much stronger than a plain flat surface, and hence it is not liable to become bent out of its proper shape by ordinary usage.

Claim.

What we claim as our improvement, and desire to secure by Letters Patent, is—
A churn-dasher, when constructed with a perforated concavo-convex disk, A, wings B, and socket C, in the manner described, and for the purpose specified.

WM. H. H. GORHAM.
BURETT H. WILLIAMS.

Witnesses:
W. A. HOPLER,
A. W. SCRANTON.